United States Patent [19]

Fischer

[11] Patent Number: 4,789,285

[45] Date of Patent: Dec. 6, 1988

[54] ANCHORING PLUG

[75] Inventor: Artur Fischer, Waldachtal, Fed. Rep. of Germany

[73] Assignee: Artur Fischer GmbH & Co. KG, Waldachtal, Fed. Rep. of Germany

[21] Appl. No.: 29,536

[22] Filed: Mar. 23, 1987

[30] Foreign Application Priority Data

Mar. 29, 1986 [DE] Fed. Rep. of Germany ....... 3610655

[51] Int. Cl.$^4$ ............................................. F16B 13/04
[52] U.S. Cl. ...................................... 411/32; 411/38; 411/34; 411/57; 411/71
[58] Field of Search .................................. 411/34–38, 411/43–45, 55, 57, 60, 71, 32, 33, 59

[56] References Cited

U.S. PATENT DOCUMENTS

| 1,248,009 | 11/1917 | Pleister | 411/60 |
| 2,559,281 | 7/1951 | Croessant | 411/38 |
| 3,174,387 | 3/1965 | Fischer | 411/37 |
| 3,187,620 | 6/1965 | Fischer | 411/60 |
| 3,413,887 | 12/1968 | Von Wolffe et al. | 411/60 X |
| 3,937,122 | 2/1976 | Riedel | 411/34 |
| 4,353,673 | 10/1982 | Lesowsky | 411/38 |
| 4,491,447 | 1/1985 | Smith et al. | 411/34 X |
| 4,642,009 | 2/1987 | Fischer | 411/71 |
| 4,662,808 | 5/1987 | Camilleri | 411/60 X |

FOREIGN PATENT DOCUMENTS

| 0032702 | 7/1981 | European Pat. Off. | 411/46 |
| 0045974 | 2/1982 | European Pat. Off. | |
| 0169335 | 1/1986 | European Pat. Off. | |
| 1884018 | 12/1963 | Fed. Rep. of Germany. | |
| 2701568 | 7/1978 | Fed. Rep. of Germany | 411/60 |
| 3344232 | 6/1985 | Fed. Rep. of Germany. | |
| 32442 | 5/1928 | Netherlands | 411/38 |
| 1092317 | 11/1967 | United Kingdom | 411/71 |
| 1107625 | 3/1968 | United Kingdom. | |
| 1221702 | 2/1971 | United Kingdom | 411/71 |
| 1541590 | 3/1979 | United Kingdom | 411/38 |
| 2091368 | 7/1982 | United Kingdom | 411/43 |

Primary Examiner—Gary L. Smith
Assistant Examiner—Suzanne L. Dino
Attorney, Agent, or Firm—Michael J. Striker

[57] ABSTRACT

A plastic plug for anchoring objects in support structures comprises an expansible portion and an elongated neck having a head portion with a flange for supporting an object being secured to the support structure. The elongated neck is formed of two spaced expansible legs and has an elliptical cross-section which merges into circles at two end portions thereof. The expansible portions of the legs are provided with longitudinal grooves which form a widening of the longitudinal bore in the head portion.

15 Claims, 1 Drawing Sheet

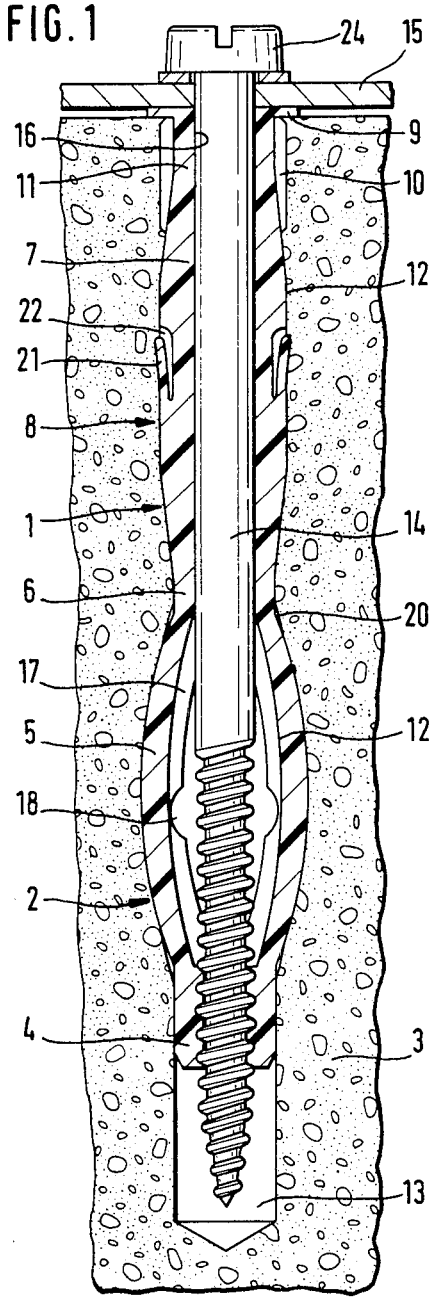
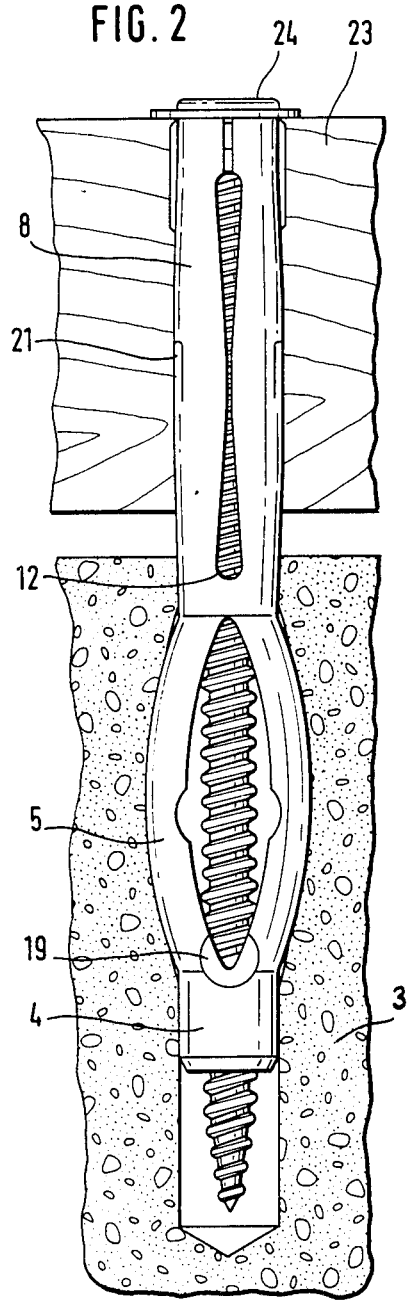
FIG. 1
FIG. 2

ANCHORING PLUG

BACKGROUND OF THE INVENTION

The present invention relates to a plug made of plastic and which is utilized for anchoring objects flush or in spaced relationship in a support structure, for example of concrete.

Plastic plugs of the type under consideration have an elongated bore which receives a fastening screw, an expansible portion which is anchored in a concrete structure, by screwing in of that fastening screw, and an elongated neck which can have ribs to secure the anchored plug against rotation.

Plugs having elongated necks are normally used for securing objects such as frames and battens to a support structure wherein the elongated neck engages the object to be secured. The function of the elongated neck is to guide the fastening screw in the plug and to fill the annular gap between the shaft of the fastening screw and the wall of the drilled hole in the object to be secured. In addition, the elongated neck may serve as a bridge for void places and in flush mountings to ensure sufficient anchoring depths, especially in porous building materials such as foam concrete and the like.

Greater anchoring depths can lead to an increase in pull-out force values if the cause of failure is that the anchoring base breaks away.

Anchoring plugs of the foregoing type have been disclosed in numerous U.S. patents of the inventor, for example U.S. Pat. Nos. 4,094,054; 4,149,350; etc.

SUMMARY OF THE INVENTION

It is an object of the present invention to provide an improved anchoring plug.

It is another object of the invention to provide an anchoring plug, the elongated neck of which would have greater pull-out values in flush mountings of the objects, especially in porous building materials, and which would also allow a spaced mounting of objects at void places.

These and other objects of the invention are attained by a plastic anchoring plug for anchoring objects in support structures, comprising a body having a longitudinal bore; and a fastening screw which is received in said bore for fastening an object to a support structure, said body including an expansible portion expanded and anchored in a hole of the support structure when said screw is inserted into said bore, a base portion connected to said expansible portion at one end thereof, and an elongated neck connected to said expansible portion at another end thereof and having a head provided with a flange and ribs to secure said neck against rotation in said hole, said elongated neck being formed by two expansible legs spaced from each other and extending from said head toward said expansible portion and merging into a sleeve-shaped shaft portion before said expansible portion, said elongated neck having a cross-section which in a middle region thereof has a shape of ellipse which merges into circles at said head and said shaft portion, respectively, said legs being separated by a gap and having surfaces which face each other, said gap having a dimension in a direction transverse to an axis of the plug, which corresponds to a difference between a major diameter and a minor diameter of said ellipse.

When the plug is used in porous non-cavity building materials, for example foam concrete, the plug is driven into a drilled hole corresponding in diameter to the outside diameter of the head and the shaft portion. As a result of the ellipse-shaped enlargement, the legs of the elongated neck of the plug are pressed together to the diameter of the drilled hole. Due to the size of the transverse dimension of the gap, this causes the surfaces defining the gap to contact each other in the middle region of the legs. This narrowing of the gap causes a corresponding displacement and wedging of the plug material in the drilled hole as the fastening screw is screwed in, with the result that a preliminary fastening occurs even before the expansible portion is reached.

The longitudinal grooves formed in the surfaces of the plug define the gap between the two legs, which grooves start from the longitudinal bore in the head portion and form a tapering screw channel which serves to guide the screw and makes it easier for the screw to cut into the material of the plug. The elongated neck of the plug thus contributes to an improvement in the anchoring, which is completed by screwing of the screw right into the expansible portion of the plug. The expansibility of the elongated neck due to the formation of two legs also provides additional securing against rotation, with the result that high turning moments can be used when anchoring the actual expansible portion.

Due to its pressure-exerting ability in the region of the elongated neck, the anchoring plug according to the invention is also suitable for spaced mountings of the objects at supporting structures since, because of the pressure exertion on the object to be secured, the spacing which is set or results from unevenness in the wall is fixed. The pressure forces acting on the object to be secured are taken up by the anchoring plug by the legs wedged in the drilled hole in the object being secured.

In a further embodiment of the invention, the fastening screw may have a thread extending as far as its head. Due to the extended thread, a thread connection is produced between the legs of the elongated neck and the fastening screw. In addition, the torque for screwing in the screw is reduced.

The legs of the elongated neck may have external surfaces provided with locking tongues. Recesses may be provided in said external surfaces, said tongues being retractable in said recesses. The locking tongues prevent the legs from giving or twisting in very porous building materials.

The expansible portion may be formed in the known fashion by two spaced expansible legs extending between said base portion and said shaft portion.

The base portion may have a longitudinal bore with an internal thread or internal ribs. With this type of the expansible portion, this plug is suitable for all building materials, even for cavity bricks and cavity mountings. When anchoring the plug in foam concrete using the aforedescribed expansible portion, it has proved especially advantageous to prepare the part of the drilled hole that is to accommodate the expansible portion using a special drilling device so that a portion of the drilled hole is widened into a pear shape. The legs of the expansible portion are thus able to bend outward and to rest against the wall of the widened portion. This produces considerably greater expansion than would be possible according to the customary expansion principle which involves screwing a fastening screw into a tapering internal drilled hole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is an axial sectional view of the plastic anchoring plug according to the invention, mountable in foam concrete; and FIG. 2 is an axial view of the plastic anchoring plug of the invention, adapted for the spaced mounting of a batten.

DETAILED DESCRIPTION OF THE PREFERRED EMBODIMENTS

The anchoring plug formed of plastic is shown in FIGS. 1 and 2. The plug designated by reference numeral 1 includes an expansible portion 2 which is expanded and held in a material in which the plug is inserted. Expansible portion 2 is suitable for all building materials. The plug illustrated in FIG. 1 is anchored in a porous non-cavity support material 3, such as foam concrete. As seen from FIG. 1 the mounting of the plug 1 in concrete 3 is flush. The expansible portion 2 of the plug includes a base portion 4 which has a longitudinal bore with internal ribs and two opposite legs 5 which extend upwardly from the base portion 4 and merge into a sleeve-like shank or shaft 6. An elongated neck 8 is an extension of shank 6. This elongated neck 8 is formed by two legs 7 and is terminated in a head portion 11 which has a flange 9 which projects from the head portion 11 at right angles thereto. The head portion 11 also has external ribs 10 which secure the same against rotation.

The shapes of cross-sections of the legs 5 of the expansible portion 2 and legs 7 of the elongated neck 8, define in each case in their middle region an ellipse which changes into a circle in each direction toward the ends of the legs. The legs 7 of the elongated neck 8 and the legs 5 of the expansible portion 2 are in each case separated from each other by a gap 12, the dimension of which in the transverse direction corresponds to the difference between the major and the minor diameters of the respective ellipse. As a result, the legs 5 and/or 7 can be pressed together to the diameter of a drilled hole 13. The surfaces defining the gap between the legs form a narrowed portion. When the plug 1 is placed in the drilled hole 13 a fastening screw 14 is screwed through an object 15 to be secured in the concrete into a longitudinal bore 16 provided in the plug 1. The narrowing which results when two pairs of legs 5 and 7 are pressed together allows the legs to be displaced and expanded as the fastening screw 14 is screwed in.

Longitudinal grooves 17 are provided in the internal surfaces of legs 5, which define, on the one hand, a gap to guide the screw 14 inserted in bore 16, and, on the other hand, these grooves facilitate cutting of the thread of the screw 14 into the material of the plug 1. Once the screw 14 has penetrated the sleeve-shaped shank portion 6, the screw 14 engages in the expansible portion 2 of the plug 1, formed by two legs 5 while the base portion 4 acts as a nut for this screw. The axial tension which results due to the screwing-in of the screw 14, leads additionally to the twisting or bending of the legs 5 of the expansible portion 2 outward. In order to facilitate this bending of the legs 5 in the outward directions, the cross-section of portion 2 is weakened by the provision of a transverse bore 18 extending in the plane of the lower gap 12 in the region of the greatest enlargement of the legs 5.

A further weakening of the cross-section of portion 2 is provided in the region where legs 5 join the base portion 4. This weakening in the cross-section is produced by two notches 19 (FIG. 2) which extend at right angles to the plane of the lower gap 12.

In order to obtain an increased expansion due to the bending of legs 5 outward even in relatively strong foam concrete, it is advantageous to form a pear-shaped widened portion 20 of the expansible portion 2 using a special drilling device. In order to reliably secure the plug 1 against rotation during the expansion operation, locking tongues 21 are formed on the legs 7 of the elongated neck 8. These tongues can be retracted into recesses 22. Longitudinal grooves provided in the surfaces define the gap between the two legs, which grooves start from the longitudinal bore in the head portion and form a tapering screw channel which serves to guide the screw and makes it easier for the screw to cut into the material of the plug.

With reference to FIG. 2 it will be seen that if a spaced mounting of a batten 23 to a concrete structure is required the expansibility of the elongated neck 8 of the plug 1 is used to fix the neck 8 of the plug 1 in the batten 23 which is to be fastened at a distance from structure 3. Once the plug 1 has been anchored, the pressure forces acting on the batten 23 are taken over by the plug, and the spacing, which has been set, is thus firmly fixed. In order to achieve a good connection between the legs 7 of the elongated neck 8 and the fastening screw 14, the thread of the screw 14 is extended as far as to its head 24.

It will be understood that each of the elements described above, or two or more together, may also find a useful application in other types of anchoring plugs differing from the types described above.

While the invention has been illustrated and described as embodied in an anchoring plug, it is not intended to be limited to the details shown, since various modifications and structural changes may be made without departing in any way from the spirit of the prevent invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plastic anchoring plug for anchoring objects in support structures, comprising a body having a longitudinal bore; and a fastening screw which is received in said bore for fastening an object to a support structure, said body including an expansible portion (2) expanded and anchored in a hole of the support structure when said screw is inserted into said bore, a base portion (4) connected to said expansible portion at one end thereof, and an elongated neck (8) connected to said expansible portion at another end thereof and having a head provided with a flange and ribs to secure said neck against rotation in said hole, said elongated neck being formed by two expansible legs spaced from each other and extending from said head toward said expansible portion and merging into a sleeve-shaped shaft portion before said expansible portion, said elongated neck having a cross-section which in a middle region thereof has a shape of an ellipse which merges into circles at said head and said shaft portion, respectively, said legs being separated by a gap and having surfaces which face each other, said gap having a diameter in a direction transverse to an axis of the plug, which corresponds to a difference between a major diameter and a minor diameter of said ellipse whereby said elongated neck is easily inserted into a bore of the object being anchored to the support structure and upon expansion of said legs reliably holds said object even at a distance from said support structure.

2. The plug as defined in claim 1, wherein said legs have external surfaces provided with locking tongues.

3. The plug as defined in claim 2, wherein recesses are provided in said external surfaces, said tongues being retractable in said recesses.

4. The plug as defined in claim 1, wherein said expansible portion is formed by two spaced expansible legs (5) extending between said base portion and said shaft portion.

5. The plug as defined in claim 4, wherein said legs of said expansible portion have longitudinal grooves which form a widening of said longitudinal bore.

6. The plug as defined in claim 5, wherein said base portion has an internal thread to receive said screw.

7. The plug as defined in claim 1, wherein said fastening screw has a thread which extends up to a head thereof.

8. The plug as defined in claim 5, wherein said base portion has internal ribs.

9. A plastic anchoring plug for anchoring objects in support structures, comprising a body having a longitudinal bore; and a fastening screw which is received in said bore for fastening an object to a support structure, said body including an expansible portion (2) expanded and anchored in a hole of the support structure when said screw is inserted into said bore, a base portion (4) connected to said expansible portion at one end thereof, and an elongated neck (8) connected to said expansible portion at another end thereof and having a head provided with a flange and ribs to secure said neck against rotation in said hole, said elongated neck being formed by two expansible legs spaced from each other and extending from said head toward said expansible portion and merging into a sleeve-shaped shaft portion before said expansible portion, said elongated neck having a cross-section which in a middle region thereof has a shape of an ellipse which merges into circles at said head and said shaft portion, respectively, said legs being separated by a gap and having surfaces which face each other, said gap having a diameter in a direction transverse to an axis of the plug, which corresponds to a difference between a major diameter and a minor diameter of said ellipse, said expansible portion being formed by two spaced expansible legs (5) extending between said base portion and said shaft portion, whereby the anchoring plug can anchor the object close to the support structure and also at a distance therefrom.

10. The plug as defined in claim 9, wherein said legs have external surfaces provided with locking tongues.

11. The plug as defined in claim 10, wherein recesses are provided in said external surfaces, said tongues being retractable in said recesses.

12. The plug as defined in claim 9, wherein said legs of said expansible portion have longitudinal grooves which form a widening of said longitudinal bore.

13. The plug as defined in claim 9, wherein said base portion has an internal thread to receive said screw.

14. The plug as defined in claim 9, wherein said fastening screw has a thread which extends up to a head thereof.

15. The plug as defined in claim 10, wherein said base portion has internal ribs.

* * * * *